United States Patent [19]

Griinke

[11] Patent Number: 5,085,246

[45] Date of Patent: Feb. 4, 1992

[54] PLURAL-RATE SURGE-SUPPRESSING VALVE

[76] Inventor: Ralph E. Griinke, Rte. 4, Box 55, Beloit, Wis. 53511

[21] Appl. No.: 527,044

[22] Filed: May 22, 1990

[51] Int. Cl.$^5$ .............................................. F16K 17/30
[52] U.S. Cl. .................................... 137/504; 137/517
[58] Field of Search ............... 137/517, 513, 504, 498, 137/625.38, 497, 460

[56] References Cited

U.S. PATENT DOCUMENTS

| | | | |
|---|---|---|---|
| 2,367,662 | 1/1945 | Baxter et al. | 137/517 |
| 2,690,762 | 10/1954 | Adams | 137/497 |
| 3,561,471 | 2/1971 | Sands | 137/517 X |
| 3,572,845 | 3/1971 | Johannesen | 137/498 X |
| 4,880,030 | 11/1989 | Terry | 137/460 |

Primary Examiner—Stephen M. Hepperle
Attorney, Agent, or Firm—M. Paul Hendrickson

[57] ABSTRACT

A valve is disclosed for use in suppressing surges of fluid flow therethrough by means of first and second flow paths the former of which has the greater fluid-handling capability but which also is subject to being closed to suppress a surge, while the latter remains open to bleed the surge pressure and effect re-opening of the former for normal flow subsequent to the surge.

13 Claims, 1 Drawing Sheet

U.S. Patent
Feb. 4, 1992
5,085,246
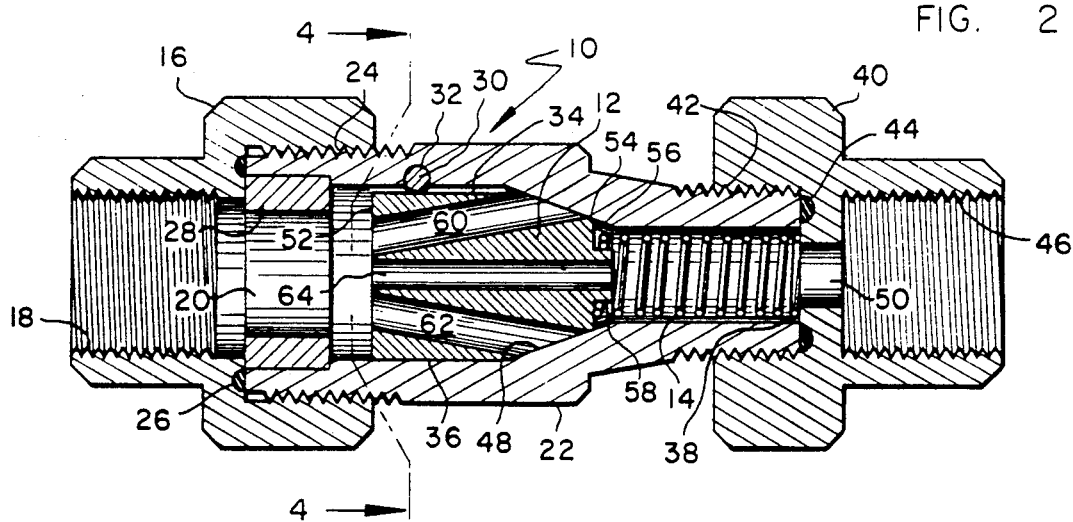
FIG. 2
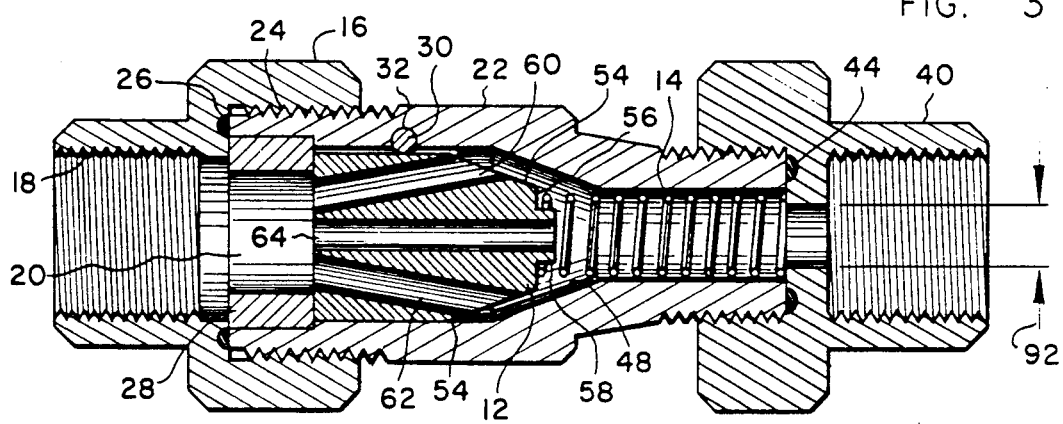
FIG. 3
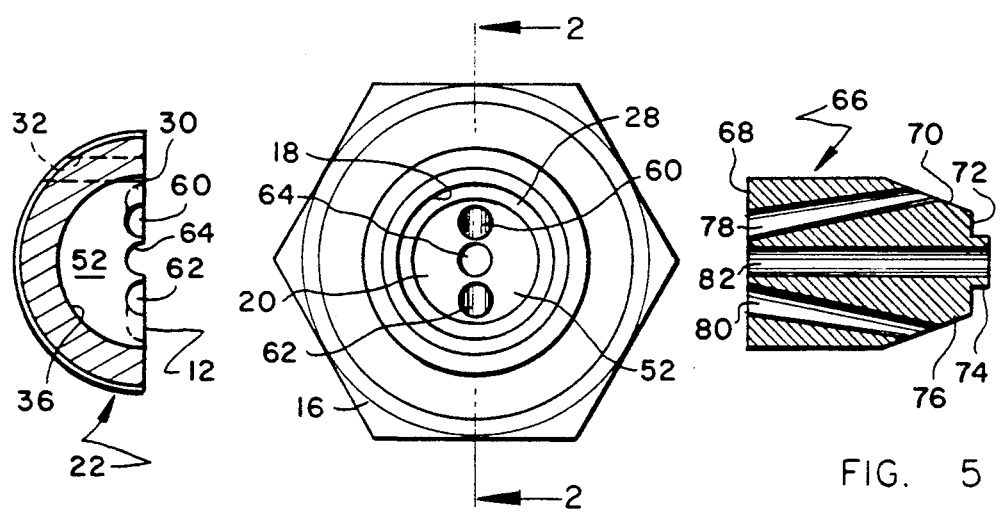
FIG. 4
FIG. 1
FIG. 5

5,085,246

PLURAL-RATE SURGE-SUPPRESSING VALVE

FIELD OF THE INVENTION

This invention pertains generally to valves for automatically suppressing surges in fluid flow in excess of a predetermined maximum allowable rate, and more particularly to a valve of this type which quickly and automatically returns to a position permitting normal fluid flow therethrough upon the dissipation of such a surge.

BACKGROUND OF THE INVENTION

The prior art abounds with valves designed to, in one manner or another, sense and suppress unacceptably large surges or increases in the rate of flow of a fluid within a system—unacceptable, that is, in the sense of either surpassing an appropriate maximum flow rate at which a normal (or nearly so) mode of operation of the system may be maintained or, on the other hand, exceeding a flow rate considered to be a maximum that may be allowed from the standpoint of operational safety for the equipment, as well as for attending personnel.

However, these prior art valves are characterized, almost universally, by an "on-off" mode of operation, one in which the fluid flow therethrough is either substantially unimpeded or, in stark contrast, is actually terminated. In addition, a feature which proves a significant disadvantage in actual practice in many instances in the prior art, once the valve has sensed a surge and has reached a completely closed position, re-setting or opening the valve must be achieved manually, either at the valve itself (which may well be at some remote or otherwise inaccessible location) or by complete, and other expensive, shutdown of the associated system in order to remove the line pressure and release the closed valve.

Illustrative U.S. Pat. Nos. include 2,601,654-Wright and 2,179,144-Buttner, each of which discloses a valve which is spring-biased toward the open position to facilitate full fluid flow, but which is closed completely by an excessive increase in fluid flow or pressure in the line, opening again only upon removal of the increment of force of the fluid by some means external of the valve—no means are included within the valve for reducing the pressure differential and, as a result, permitting automatic reopening of the valve for allowing a re-establishment of normal operation.

A similar operation obtains in the drain valve of U. S. Pat. No. 2,136,898 - Thomas, in which liquid drain is effected through the normally open valve, which is then closed against a spring bias by incoming steam pressure.

An example of another type of valve by means of which regulation is achieved is U.S. Pat. No. 2,716,398 -McMullen, in which the valve member, in this instance, is normally fully closed by a biasing spring and oscillates or flutters between the positions of fully closed and fully open under the influence of an in order to regulate the vapor flow.

BRIEF SUMMARY OF THE INVENTION

In contrast to the known prior art, especially as exemplified by the foregoing patents, the present invention provides surge suppression accompanied by automatic return to normal flow. Somewhat more specifically, the valve of the present invention affords the system with which it is associated the advantages of immediate sensing of and reaction to a surge of flow rate in excess of a predetermined maximum allowable value to restrict such flow to a second and significantly smaller rate, thereby continuing the flow at the lesser rate to bleed fluid from the high-pressure side of the valve to the low pressure or downstream side of the valve to dissipate the differential created at the valve by the surge pulse, instead of being "locked up" by such differential pressure, which would otherwise remain, absent leakage in the system.

BRIEF DESCRIPTION OF THE DRAWINGS

FIG. 1 is a front view (intake) of the valve of the present invention.

FIG. 2 is a longitudinal sectional view of the valve taken along line 2—2 of FIG. 1 with the reciprocable valve member shown in a first position.

FIG. 3 is a longitudinal sectional view of the valve of the present invention identical to that of FIG. 2 but for its showing of the movable valve member in a second position.

FIG. 4 is a transverse section taken on line 4—4 in FIG. 2.

FIG. 5 is a detail view, in section similar to that of FIGS. 2 and 3, of a modified form of the movable valving member thereof.

DETAILED DESCRIPTION OF A PREFERRED EMBODIMENT

The longitudinal sections of FIGS. 2 and 3 taken on line 2—2 in FIG. 1 illustrate the overall configuration of the surge-suppressing valve 10 of the present invention, as well as the details of the internal parts thereof. FIG. 2 shows the movable valve member 12, which along with helical spring 14 comprise the two moving parts of the valve, in a first position, in which normal flow of fluid through the valve has been restricted or partially interrupted as a result of a surge in the upstream line (not shown) which in the use of the valve is threadedly engaged with an inlet or upstream fitting 16 having a threaded portion 18 for effecting such connection, such fitting partially defining an inlet chamber 20. Similarly, FIG. 3 shows the reciprocable valve member 12 in a second position, in which normal flow of fluid through the valve has been re-established, subsequent to the termination of the surge per se and the following dissipation of the surge pressure as afforded by the novel structure of the present invention. As will be realized from an observation of these two figures, the extremes of the reciprocating travel of movable valve member 12 are shown, respectively, therein. Also, and as is customary, each of the members or elements shown in FIG. 2 and 3 (and in FIGS. 4, for that matter) bears the same reference numeral in each view.

Inlet chamber 20 is further defined by the upstream end of valve body 22, which is threadedly engaged with fitting 16 at 24, the upstream extremity of valve body 22 conveniently urging an O-ring 26 into compression to effect a fluid seal between the two members 16 and 22. Also defining, in part, inlet chamber 20 is a sleeve 28, one face of which, by abutment with valve member 12, serves to define the aforesaid second position of the movable valve member 12, as shown in FIG. 3. If desired, an anti-rotation pin 30 may be retained in a suitable aperture or slot 32 in valve body 22 for engagement with a flat 34 on the outer cylindrical surface 36 of movable valve member 12 in order to prevent rotation thereof about its longitudinal centerline (not shown).

As mentioned above, helical spring 14 constitutes one of the two moving parts of the valve 10, this spring extending between a shoulder 38 internal of an outlet or downstream fitting 40, which is threadedly secured to the main valve body 22 at 42, and sealed thereto by O-ring 44. Screw threads 46 are provided internally of fitting 40 for engagement with a downstream line (not shown). Outlet fitting 40 and the end portion of valve body 22 downstream of conical valve seat 48 serve to define an outlet chamber 50, the larger portion of which is occupied by helical spring 14, which also bears upon the movable valve member 12, and a smaller portion 92, which is an outlet bore having a crosssectional area that is minutely restrictive of the full flow rate of valve member 12.

Referring now simultaneously to FIGS. 2, 3 and 4 in order better to effect a description of movable valve member 12, it will be observed that the member 12 is of generally cylindrical configuration, having a planar upstream face 52, conical first downstream face 54 which mates with valve seat 48, and a substantially planar second downstream face 56, which may be interrupted centrally, if desired, by a short tubular extension 50, which may serve to, among other things, assist in maintaining a substantially central positioning of the upstream end of helical spring 14, especially as the Valve member 12 moves to the position shown in FIG. 3, where the adjacent end of spring 14 is otherwise relatively free to move laterally.

First flow passage means in the form of a pair (in the embodiment shown) of substantially cylindrical passages or tubular apertures 60 and 62 extend from upstream face 52, and at a suitable angle with respect to the longitudinal centerline (not shown), to first downstream face 54, which is at an angle allowing it to mate with valve seat 48 and thereby closes passages 60 and 62 (as shown in FIG. 2).

A second flow passage means in the form of a substantially cylindrical passage or tubular aperture 64 extends from the upstream face 52 of movable member 12 to the second downstream face 56, actually extending just past the face 56, in the embodiment shown, by way of tubular extension 58. The cross-sectional area of passage 64 is less than that of either of passages 60 and 62, or at the most less than their sum, and in this manner the first flow passage means of the invention (again, the two passages 60 and 62 in the embodiment shown) has a fluid-handling capability greater than that of the second flow passage means (tubular passage 64).

It will be appreciated by those skilled in the art that the actual number of passages which make up the first flow passage means is not limited to two, as shown, but may be any desired number (including one, at least theoretically), and the size of the cross-section of the individual passages may vary, from each other or from embodiment to embodiment. What must be borne in mind is that the cumulative fluid-handling capability of the first flow passage means, irrespective of the number and size of the individual passages, determines along with the fluid-handling capability of the second flow passage means (passage 64), the maximum allowable relatively unimpeded rate of fluid flow through the valve, which is another way of stating that these parameters define the maximum flow rate, approaching a surge, permitted through the valve as shown in FIG. 3 prior to the application of an upstream force of sufficient magnitude to overcome the bias of spring 14 and move the parts to the position shown in FIG. 2, in which only the second flow passage means remains open between the inlet and outlet chambers.

As shown in the embodiment of FIGS. 2 through 4, the several passages through the movable valve member 12 are of substantially constant cross-section along their respective lengths, and are, in fact, cylindrical as shown. However, and as will be appreciated by those skilled in the art, the present invention is not limited to the configuration shown in connection with this description of one preferred embodiment of the invention. One alternate embodiment is illustrated in FIG. 5, wherein reference numeral 66 indicates generally the modified movable valve member, having a planar upstream face 68, a first downstream face 70 of conical shape enabling it to conform to the valve seat 48 in the earlier figures, and a substantially planar second downstream face 72, interrupted (as in the first embodiment) by a tubular extension 74.

The main body 76 of valve member 66 includes first flow passage means comprising tubular passages 78 and 80, as well as second flow passage means in the form of tubular passage 82. As may be seen in the drawing, passage 82 is shown as being cylindrical, as in passage 64 in the earliest figures, but the two passages 78 and 80 are tapered, decreasing in cross-section along their length in the downstream direction.

Turning now to the operation of the surge-suppressing valve of the present invention, and with particular reference to FIGS. 2 through 4, under conditions of normal fluid flow, and in the absence of any significant surges therein, the movable valve member 12 and spring 14 are in the respective positions shown in FIG. 3, with the fluid flowing in substantially unimpeded fashion through the entire valve, including all three passages of the combined first and second flow passage means, the spring 14 being sufficiently strong to hold valve member 12 in the FIG. 2 position in the face of fluid flow therethrough at a rate not in excess of a predetermined allowable maximum.

Upon the occurrence of a surge in excess of that predetermined maximum rate, the cumulative fluid forces acting upon the various surfaces of movable valve member 12 together overcome the bias of spring 14 and move valve member 12 to the position shown in FIG. 2, wherein the passages 60 and 62 of the first flow passage means are closed as valve member 12 seats against valve seat 48. Since this first flow passage means passes the major part of the fluid flowing through the valve, their closure is effective in preventing the surge from passing through the valve of downstream portions of the overall system.

However, the flow is never completely interrupted, since the second flow passage means (passage 64) is in continuous communication with both the inlet and outlet chambers, and this continued, but relatively smaller, flow, while not passing the surge downstream, serves to bleed the surge from the inlet to the outlet chambers, reducing the differential pressure therebetween at a rate determined by the fluidhandling capability of this second flow passage means, a capability which is determined primarily by the size of the passage and which may be varied by the selective use of a plurality of movable valve members each having a second flow passage means of a respectively different size. As will also be apparent, the selective use of a plurality of movable valve members also affords a choice in determining the maximum flow rate that is to be permitted without activation of the valve to suppress surges in excess thereof.

It should also be observed that the fluid-handling capability of the flow passage means can be selected or predetermined by passage parameters other than size. For example, the fact that the passages 60 and 62 are at an angle with respect to the centerline provides increased resistance to the flow of fluid therethrough, as would any non-linearity in the flow path itself.

A variation in cross-section along the length of the first flow passage means is shown in FIG. 5, where the cross-section decreases in the direction of flow, adding to the resistance to the flow and thus reducing the flo-whandling capability thereof.

The invention has been described herein in considerable detail, and primarily with respect to the specifics of a preferred embodiment. However, modifications within the scope of the invention will occur to those skilled in the art. Hence, the invention should not be considered to be confined to the details given in connection with description of a preferred embodiment, but only as limited by the scope of the appended claims.

What is claimed is:

1. A plural-rate surge-suppressing fluid valve responsive to sudden increases in upstream flow, comprising
   a valve body having inlet and outlet chambers;
   a valve seat located between said chambers;
   a movable cylindrical valve member having an upstream face in continuous communication with said inlet chamber and having first and second downstream faces, said first downstream face mating with said valve seat when the movable valve member is in a fist position, and said second downstream face being in continuous communication with said outlet chamber, which as a smaller portion outlet bore having a cross-sectional area that is minutely restrictive of the full flow rate of said valve member, first flow tubular passages means disposed at an angle from a centerline and extending from said upstream face to said first downstream face, wherein fluid-handling capability of said first flow tubular passages means being such as to pass substantially unimpeded only a fluid flow having a rate less than a predetermined allowable maximum;
   second flow tubular passage means having a cross-sectional area less than said first flow passages and extending from said upstream face to said second downstream face, wherein fluid-handling capability of said second flow tubular passage means being restricted to a rate less than that of said first flow tubular passages means; and
   means for resiliently urging said movable valve member away from said valve seat to a second position;
   whereby the effect of the resilient urging means is overcome by the force of impeded fluid flow in said first flow tubular passages means upon the occurrence of a surge in excess of said predetermined allowable maximum flow of fluid through said valve to thereby move said valve member to said first position to close said first flow tubular passages means.

2. A surge-suppressing valve in accordance with claim 1, wherein restricted flow of fluid through said second flow tubular passage means when said valve is in said first position effects a gradual bleeding reduction of upstream surge pressure, permitting movement of said movable valve member to said second position under the influence of said resilient means.

3. A surge-suppressing valve in accordance with claim 1, wherein said first flow passages means comprises a tubular passageway having a cross-section of a first size, and said second flow passage means comprises a tubular passageway having a cross-section of a second size.

4. A surge-suppressing valve in accordance with claim 3, wherein said first and second sizes are different from each other.

5. A surge-suppressing valve in accordance with claim 4, wherein said second size is smaller than said first size.

6. A surge-suppressing valve in accordance with claim 1, wherein said first flow tubular passages means is a cylindrical passageway having a diameter of a first size.

7. A surge-suppressing valve in accordance with claim 6, wherein said second flow tubular passage means comprises a substantially cylindrical passageway having a diameter of a second and different size.

8. A surge-suppressing valve in accordance with claim 7, wherein said second size is smaller than said first size.

9. A surge-suppressing valve in accordance with claim 1, wherein said first flow passages means comprises a tubular passageway the cross-section of which decreases between said upstream face and said second downstream face.

10. A surge-suppressing valve in accordance with claim 1, wherein said first flow tubular passages means comprises a plurality of distinct passageways.

11. A plural-speed surge-suppressing valve responsive to sudden increase in upstream flow, comprising
    a valve body having inlet and outlet chambers;
    a valve seat located between said chambers;
    a movable cylindrical valve member having an upstream face in continuous communication with said inlet chamber and having first and second downstream faces, said first downstream face mating with said valve seat when said valve member is in a position establishing a first flow speed, and said second downstream face being in continuous communication with said outlet chamber, which has a small portion outlet bore having a cross-sectional area that is minutely restrictive of the full flow rate of said valve member;
    first flow tubular passages means disposed at an angle from a centerline and extending from said upstream face to said first downstream face, wherein fluid-handling capability of said first flow tubular passages means being such as to pass substantially unimpeded only a fluid flow having a rate less than a predetermined allowable maximum;
    second flow tubular passage means extending from said upstream face to said second downstream face, the fluid-handling capability of said second flow tubular passage means being restricted to a rate less than that of said first flow tubular passages means; and
    means for resiliently urging said movable vale member away from said valve seat to a position establishing a second flow speed;
    whereby the effect of the resilient urging means is overcome by the force of unimpeded fluid flow in said first flow tubular passages means upon the occurrence of a surge in excess of said predetermined allowable maximum flow of fluid through said valve to thereby move said valve member to said first position to close said first flow tubular passages means.

12. A surge-suppressing valve in accordance with claim 11, wherein said second flow speed is greater than said first flow speed.

13. A surge-suppressing valve in accordance with claim 12, wherein restricted flow of fluid through said second flow tubular passage means when said valve is in said first position effects a gradual bleeding reduction of upstream surge pressure, permitting movement of said movable valve member to said second position under the influence of said resilient means.

* * * * *